(12) United States Patent
Metz et al.

(10) Patent No.: US 8,170,014 B1
(45) Date of Patent: May 1, 2012

(54) MULTIPLE NAT TRAVERSAL PROTOCOL

(75) Inventors: Christopher Metz, Danville, CA (US);
Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 260 days.

(21) Appl. No.: 12/507,485

(22) Filed: Jul. 22, 2009

(51) Int. Cl.
*H04L 12/28* (2006.01)

(52) U.S. Cl. ........................................ 370/389

(58) Field of Classification Search ................. None
See application file for complete search history.

(56) References Cited

U.S. PATENT DOCUMENTS

| | | | | |
|---|---|---|---|---|
| 6,353,614 | B1 * | 3/2002 | Borella et al. | 370/389 |
| 6,985,479 | B2 * | 1/2006 | Leung et al. | 370/352 |
| 7,042,876 | B1 * | 5/2006 | Jayasenan et al. | 370/389 |
| 7,139,841 | B1 * | 11/2006 | Somasundaram et al. | 709/245 |
| 7,315,888 | B2 * | 1/2008 | Shibata | 709/223 |
| 7,483,393 | B2 | 1/2009 | Wing | |
| 7,515,549 | B2 | 4/2009 | Wing et al. | |
| 7,542,463 | B2 * | 6/2009 | Biswas et al. | 370/352 |
| 2008/0159306 | A1 | 7/2008 | Pande et al. | |

* cited by examiner

*Primary Examiner* — Robert Wilson
(74) *Attorney, Agent, or Firm* — Hickman Palermo Truong & Becker LLP

(57) ABSTRACT

Systems, methods, and other embodiments associated with multiple NAT traversal are provided. A request is received from a host for a publicly-routable communication path identifier for the host, where the host is a member of a private network associated with a first network address translation device. The first network address translation device communicates with a second network address translation device using an address-port-borrowing-protocol to acquire information related to the publicly-routable communication path identifier. Information related to the publicly-routable communication path identifier is received with the first network address translation device and the publicly-routable communication path identifier is provided to the host.

18 Claims, 10 Drawing Sheets

US 8,170,014 B1

MULTIPLE NAT TRAVERSAL PROTOCOL

TECHNICAL FIELD

The present disclosure relates generally to network address translation (NAT).

BACKGROUND

Network address translation (NAT) is a technique that is used to map more than one host device to a single IP (Internet Protocol) address. The hosts behind a NAT device have private or "hidden" addresses and typically initiate communication through the NAT device. For incoming packets, the NAT device routes the packets to the private address of the host device. As a side effect of its multiplexing, the NAT obscures the connectivity information for the host devices behind a NAT device from devices outside the private network.

BRIEF DESCRIPTION OF THE DRAWINGS

The accompanying drawings, which are incorporated in and constitute a part of the specification, illustrate various example systems, methods, and other example embodiments. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DESCRIPTION OF EXAMPLE EMBODIMENTS

Overview

Figure 1:
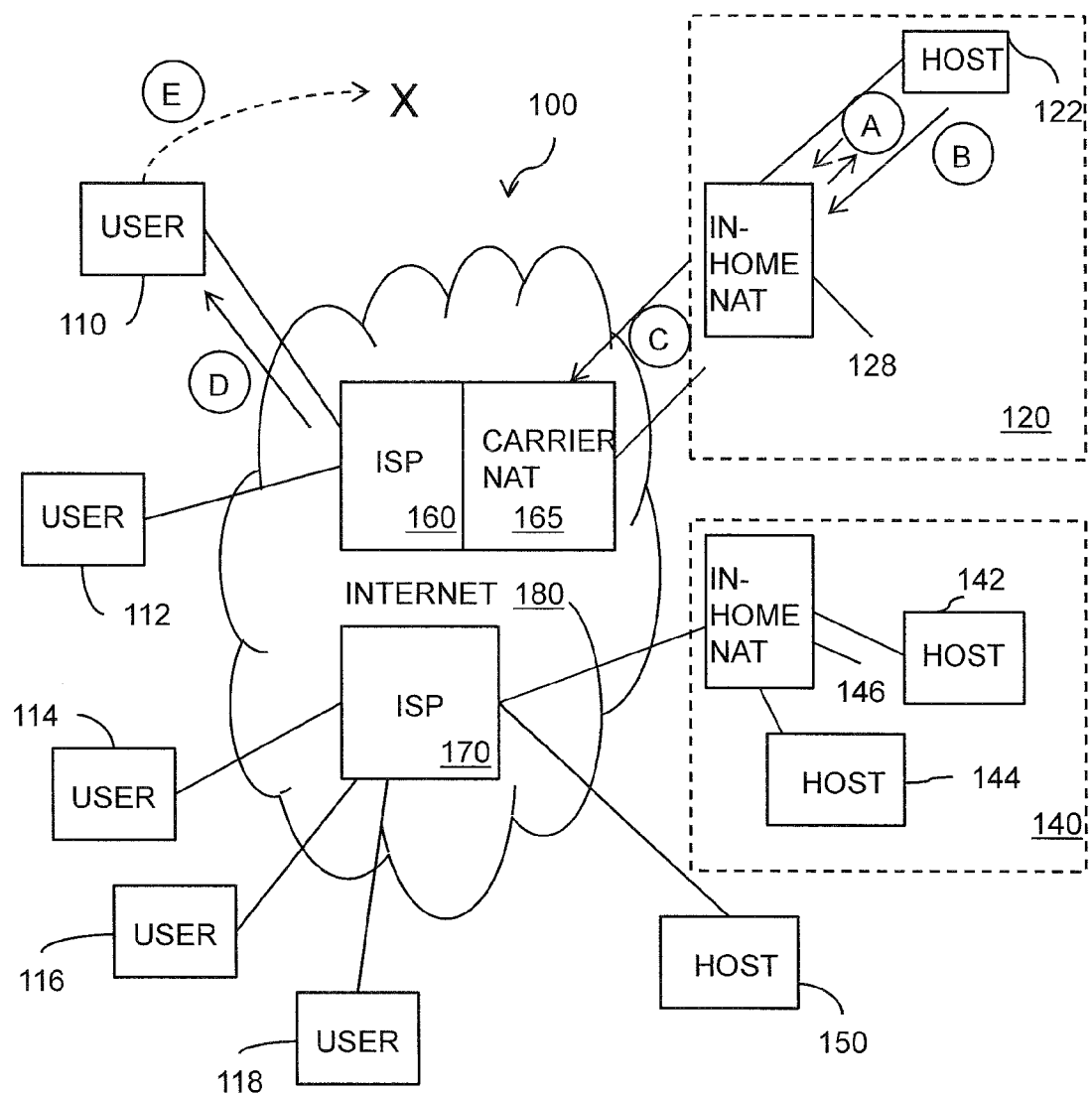
FIG. 1 illustrates a functional block diagram of a network that includes multiple NAT devices.

In one embodiment, an apparatus includes a receipt logic configured to receive a request for a publicly-routable communication path identifier from a host that is a member of a private network that includes a first network address translation device associated with the private network, the host having a private communication path identifier. The apparatus also includes a request logic configured to request information related to the publicly-routable communication path identifier from a second network address translation device that is disposed in a communication path between the host and one or more user devices outside of the private network, the request logic also being configured to receive the information related to the publicly-routable communication path identifier from the second network address translation device. The apparatus also includes a response logic configured to respond to the request by providing the publicly-routable communication path identifier to the host.

In another embodiment, a method includes receiving with a first network address translation device a request for a publicly-routable communication path identifier from a host that is a member of a private network associated with the first network address translation device, the host having a private communication path identifier. The method also includes controlling the first network address translation device to communicate with a second network address translation device using an address-port-borrowing-protocol to acquire information related to the publicly-routable communication path identifier, where the second network address translation device is disposed in a communication path between one or more user devices outside the private network and the host. The method also includes receiving, with the first network address translation device, information related to the publicly-routable communication path identifier. The method also includes providing the publicly-routable communication path identifier to the host.

Description

Many software applications that involve communication over the Internet between an Internet user and a host device require that the host device provide a publicly-routable transport address. A transport address is typically comprised of the IPv4 address, protocol (typically TCP or UDP), and the TCP or UDP port number. Applications that typically require a publicly-routable address need incoming connections and those applications typically include voice over Internet (VoIP) service, peer-to-peer file sharing, and video gaming systems. Many currently available NAT devices are able to provide a publicly-routable transport address to a requesting host.

Typically, the NAT device uses one of two ways to obtain a publicly-routable transport address. The first way is to use a standard protocol (e.g., the Internet Gateway Device Protocol as defined by the Universal Plug and Play Forum (UPnP IGD), network address translation port mapping protocol (NAT-PMP), STUN (RFC5389)) to obtain a publicly-routable transport address or port. The second way is to use an application layer gateway (ALG), which is a software component that is part of a NAT device. The software component is tailored to the specific application (e.g., FTP, SIP, H.323) and rewrites application packets to reflect the connectivity of the private network behind the NAT.

Once the publicly-routable transport address is obtained, it can be communicated to other Internet users using a protocol (e.g., Session Initiation Protocol (SIP), H.323 protocol for packet networks, Real Time Streaming Protocol (RTSP), a gaming protocol). Out of a band mechanisms (e.g., email, telephone calls) may also be used to communicate the host's publicly routable transport address. The Internet users to whom the address is communicated can then directly connect to, or communicate with, the host behind the NAT device using the publicly-routable transport address. This direct connectivity, usually a TCP/IP (Transport Control Protocol/Internet Protocol) connection, between a host behind a NAT device and Internet users outside of the host's private network is known generally as NAT traversal.

The presence of multiple NAT devices in a communication path between an Internet user and a host is becoming more common because IPv4 addresses are being exhausted and carriers and hosts use NAT devices to enable Internet access without a dedicated IPv4 address. If a host that is part of a private network with a NAT device is part of a larger network that also includes a NAT device, applications that require incoming connections often do not work, depending on how they obtain their publicly-routable transport address. This situation may arise, for example, when an in-home private network receives Internet service from a carrier that also uses a NAT device. The IP address assigned to the in-home NAT device is not a publicly-routable transport address because the in-home NAT device is hidden behind the carrier's NAT device; it is the carrier's NAT device that has the publicly-routable IP address. When the in-home NAT device receives a request for a publicly-routable transport address for a host in the private network, the in-home NAT will provide its Wide Area Network (WAN) address. This address is not a publicly-routable address because it is hidden behind the carrier NAT. Thus, a connection between the requesting Internet user and the host cannot be established using the address provided by the in-home NAT device. While the methods and systems described herein will be in connection with a carrier NAT device and an in-home NAT device, it should be appreciated that the methods and systems can be employed with two NAT devices in the same communication path.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic.

It has proven convenient at times, principally for reasons of common usage, to refer to these signals using terms including but not limited to bits, values, elements, symbols, characters, terms, and numbers. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining refer to actions and processes of a computer system, logic, processor, or similar electronic device that manipulates and transforms data represented as physical (electronic) quantities.

FIG. 1 is a functional block diagram that illustrates a large network 100 with multiple NAT devices. Multiple Internet users 110, 112, 114, 116, 118 are able to access multiple hosts 122, 142, 144, 146, 150 via the Internet, denoted generally with reference numeral 180. Two private networks 120, 140 are shown, each with multiple hosts connected behind in-home NAT devices 128, and 146. The hosts typically subscribe to an Internet Service Provider (ISP) or carrier that routes communications between users and the host using an IP address that has been assigned to the host. ISP 170 does not have a NAT device, so that a direct connection can be established between a user and host 150 without the need for NAT traversal. A direct connection can also be established between the hosts 142, 144 in the private network 140 using the standard NAT traversal techniques discussed above.

ISP 160 has a carrier NAT device 165 and therefore there are two NAT devices in a communication path between the users and the host 122. The two NAT devices include the carrier NAT device 165 and the in-home NAT device 128. As shown in FIG. 1, the host 122 seeks a direct connection with the user 110. The host requests a publicly-routable transport address from the in-home NAT device and receives the in-home NAT device's WAN address as shown by "A". The host responds to the request by communicating the WAN address to an internet user 110 as shown by "B"-"D". The user 110 then attempts to connect to the host 122 using the WAN address at "E" and the connection fails because the in-home NAT device's WAN address is not publicly addressable since the in-home NAT device is hidden behind the carrier NAT device 165.

Figure 2:
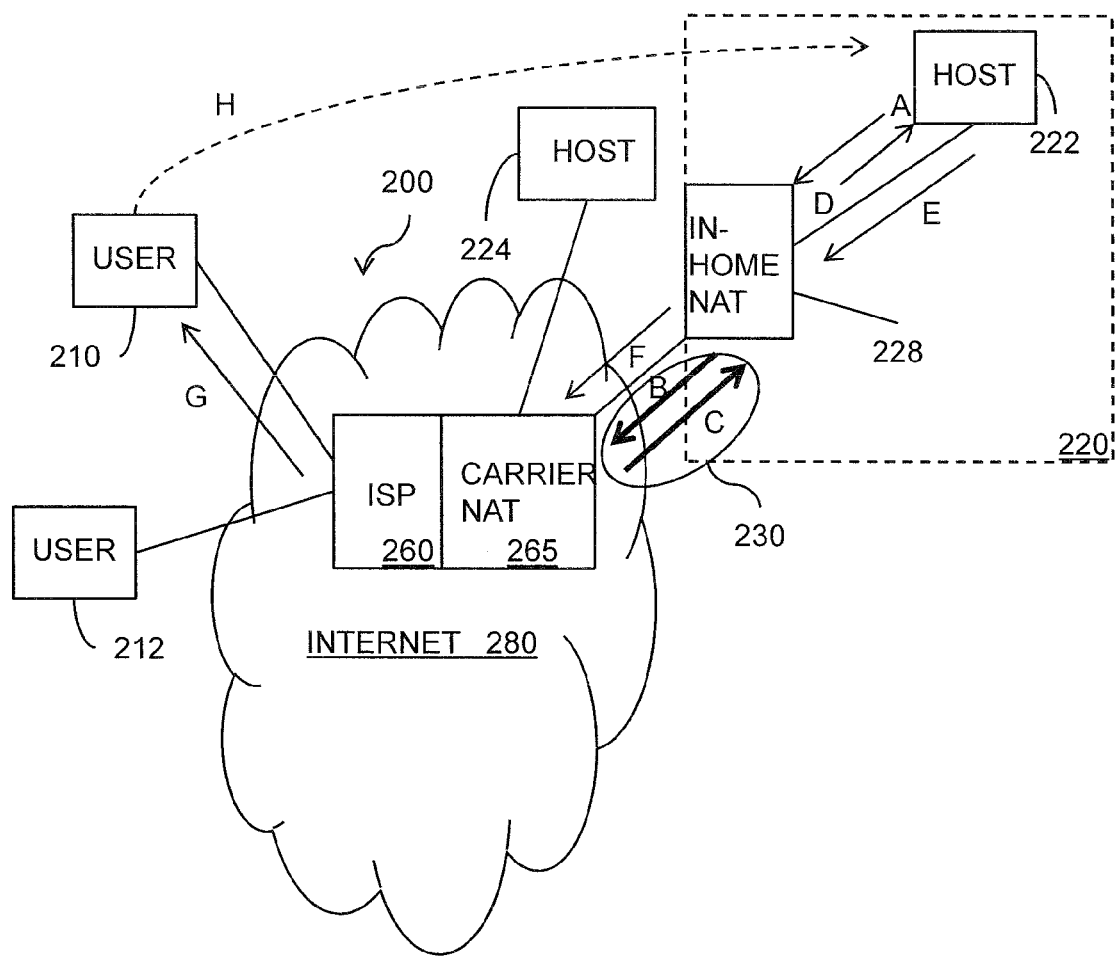
FIG. 2 illustrates a functional block diagram of a network that includes an example multiple NAT traversal system.

FIG. 2 illustrates a large network 200 that includes multiple NAT devices. Multiple Internet users 210 and 212 are able to access multiple hosts 222 and 224 via the Internet, denoted generally with reference numeral 280. An in-home NAT device 228 is capable of performing NAT traversal over multiple NAT devices using an address-port-borrowing-protocol 230 that will be described in more detail herein. In FIG. 2, the host 222 desires a publicly-routable transport address. As shown by "A" the host requests a publicly-routable transport address from the in-home NAT device 228. The in-home NAT device 228 then communicates with the carrier NAT device 265 as shown by "B" to obtain routing information from the carrier NAT device. The carrier device replies as shown by "C" in a manner that enables the in-home NAT device to provide a publicly-routable transport address for the host 222. The in-home NAT device 228 communicates the publicly-routable transport address to the host 222 as shown by "D". The host 222 may then communicate the publicly-routable transport address to an internet user 210 along "E"-"G". As shown by "H", the user 210 is then able to establish a "direct" connection with the host 222. While a "direct" connection is illustrated, one skilled in the art will appreciate that physical communications from user 210 to host 222 will still pass through ISP 260 and other network components.

Figure 3:
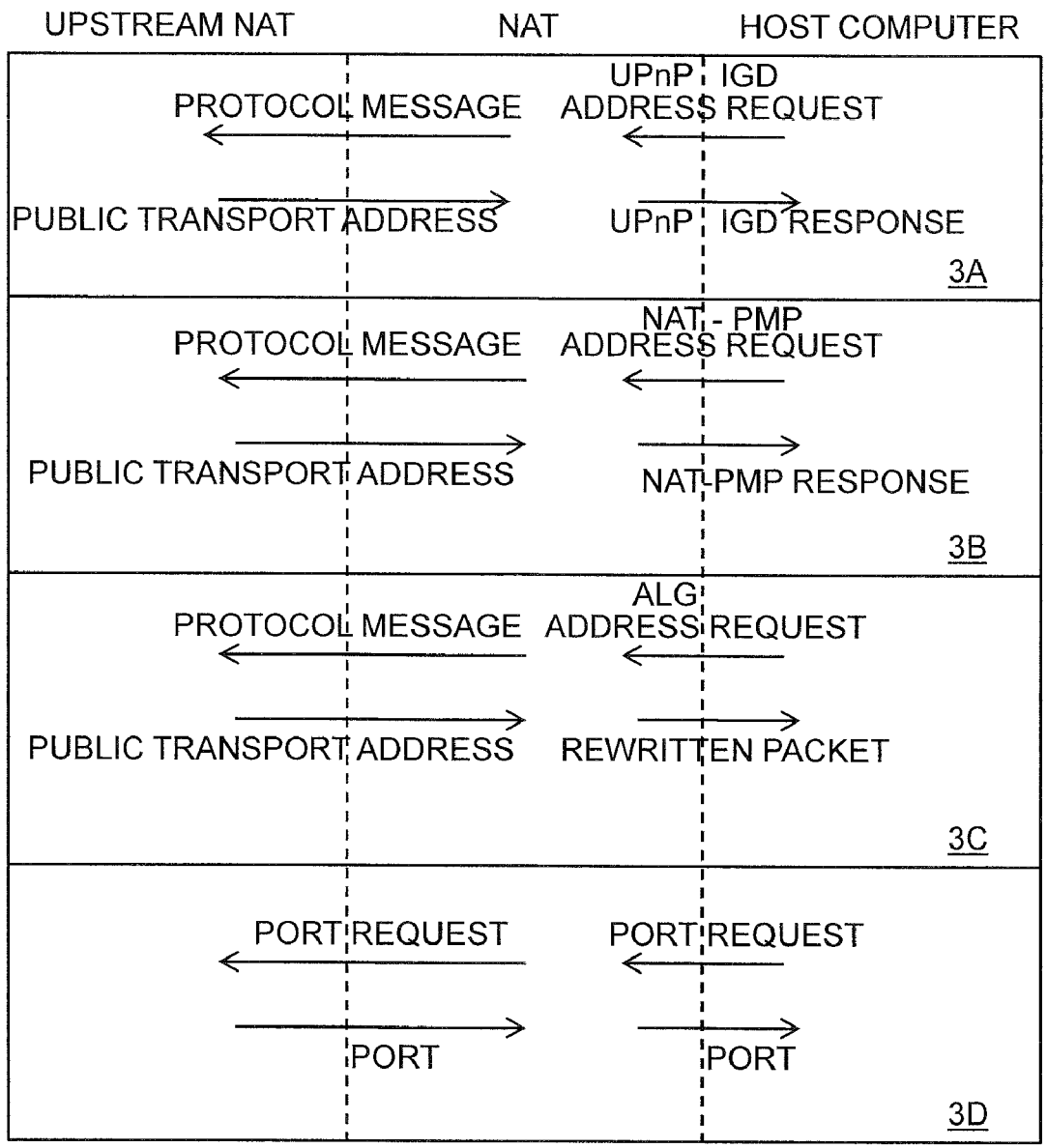
FIG. 3 illustrates a functional block diagram of an example multiple NAT traversal system.

FIG. 3 is a functional block diagram that shows operation of four example instances of an address-port-borrowing-protocol being used by an in-home NAT device to obtain a publicly-routable transport address from an upstream NAT device. Three components are illustrated in FIG. 3, a host computer, a NAT device (e.g., an in-home NAT device), and an upstream NAT device. In the example instance 3A, the host computer utilizes a UPnP IGD protocol to make a request for a publicly-routable transport address from the NAT device. This UPnP IGD request triggers the NAT device to send an address-port-borrowing-protocol message to the upstream NAT device. The NAT receives the response from the upstream NAT device and composes a UPnP IGD protocol response that communicates the publicly-routable transport address that allows traversal of both the NAT device and the upstream NAT device to the host computer.

In the example instance 3B, the host computer utilizes a NAT-PMP protocol to make a request for a publicly-routable transport address from the NAT device. This NAT-PMP request triggers the NAT device to send an address-port-borrowing-protocol message to the upstream NAT device. The NAT device receives the response from the upstream NAT device and composes a NAT-PMP protocol response that communicates the publicly-routable transport address that allows traversal of both the NAT device and the upstream NAT device to the host computer.

In the example instance 3C, the host computer sends an application packet which is intercepted by the ALG in the NAT device. This ALG packet triggers the NAT device to send an address-port-borrowing-protocol message to the upstream NAT device. The NAT receives the response from the upstream NAT device and rewrites the application packet as necessary to communicate the publicly-routable transport address that allows traversal of both the NAT device and the upstream (e.g., carrier) NAT device to the host computer.

In the example instance 3D, the host computer sends a port request for a publicly-routable transport address and specific port from the NAT device. This port request triggers the NAT device to send an address-port-borrowing-protocol message to the upstream (e.g., carrier) NAT device. The NAT receives the response from the upstream NAT device and responds to the request to communicate the publicly-routable transport address and specific port that allows traversal of both the NAT device and the carrier NAT device to the host computer.

In the examples shown in FIGS. 2 and 3, the multiple NAT traversal capability resides in the in-home NAT device as it employs an address-port-borrowing-protocol to enable traversal of multiple NAT devices in a communication path between a host and an Internet user. The multiple NAT traversal capability could also reside in the carrier NAT device. However, practicing the address-port-borrowing protocol to achieve multiple NAT traversal within the in-home NAT device, rather than the carrier NAT device, may yield superior results for several reasons.

For example, simply forwarding the UPnP IGD or NAT-PMP request to the upstream (e.g., carrier) NAT device would include implementing these protocols on the carrier NAT device, which could result in degradation of security for hosts that subscribe to the carrier associated with the carrier NAT device. This is because both of the protocols allow any host on the NAT device to create a binding for other hosts on the NAT device, which may be acceptable in a small, in-home, private network, but may not be acceptable to all subscribers to a particular carrier.

Further, implementing ALG in the carrier NAT device to enable it to handle requests for publicly-routable transport addresses would involve the carrier maintaining and updating possibly multiple ALG components. This arrangement would leave the host to rely on the carrier for NAT traversal capability, when it could be resident in the in-home NAT. The example multiple NAT traversal techniques illustrated in FIG. 3 may also produce superior results since the applications running on the host computer can continue to issue their standard request for a publicly-routable transport address using their standard protocol. The requests from the host computer serve as a trigger to the in-home NAT device to utilize the address-port-borrowing-protocol to obtain the routing information from the carrier NAT device. The in-home NAT device then formulates a response that communicates the publicly-routable transport address to the application in a manner that is expected by the application.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
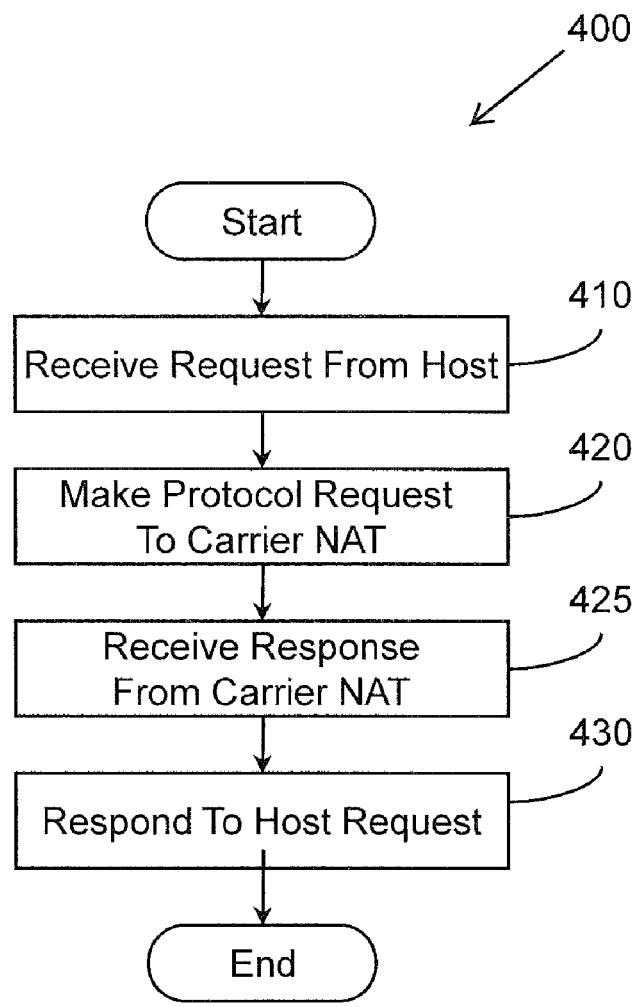
FIG. 4 illustrates an example method associated with multiple NAT traversal.

FIG. 4 is a flow diagram of an example method 400 that facilitates multiple NAT traversal. At 410, method 400 includes receiving, with a first network address translation device, a request from a host for a publicly-routable communication path identifier. The identifier may be, for example, an IP address, or a port for a host. The host is a member of a private network associated with the first network address translation device and has a private communication path identifier. In one embodiment, the first network address translation device is an in-home network address translation device.

The method 400 includes, at 420, controlling the first network address translation device to communicate with a second network address translation device using an address-port-borrowing-protocol to acquire information related to the publicly-routable communication path identifier. The second network address translation device is disposed in a communication path between the one or more user devices outside the private network and the host. At 425, a response is received from the second network translation device that includes information related to the publicly-routable communication path identifier. At 430, the method 400 includes responding to the request by providing the publicly-routable communication path identifier to the host.

In one example, executable instructions associated with performing a method may embodied on a computer readable medium. When executed, the instructions may control a computer to perform a method. Thus, in one example, a computer readable medium may store computer executable instructions that if executed by a machine (e.g., computer) cause the machine to perform method 400. While executable instructions associated with the above encoded methods are described as being embodied on a computer readable medium, it is to be appreciated that executable instructions associated with other example methods described herein may also be stored on a tangible media like a computer readable medium. In one example, the tangible media may be an application specific integrated circuit (ASIC).

A "computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

Figure 5:
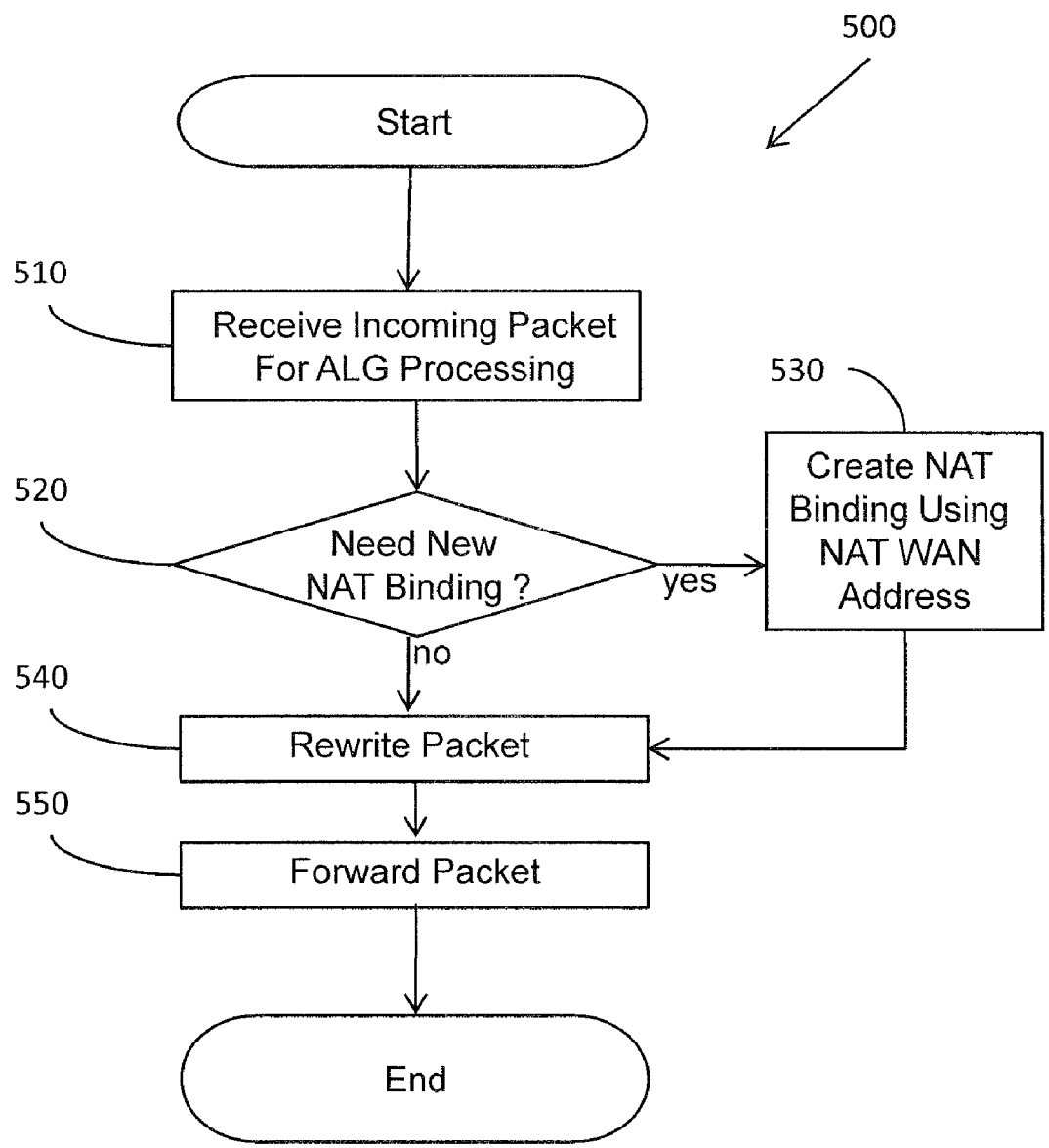
FIG. 5 illustrates an example method associated with NAT traversal.

FIG. 5 illustrates a method 500 for providing a publicly-routable transport address to a requesting host that communicates with an in-home NAT device that has ALG functionality. At 510, an incoming packet that includes the request is received by the in-home NAT device for ALG processing. At 520, a determination is made as to whether a new NAT binding is needed to process the packet. At 530, if a new NAT binding is needed, the NAT binding is created using the NAT device's WAN address. At 540 the packet is rewritten to reflect the NAT binding that includes the WAN address. At 550 the packet is forwarded to the requesting host. As discussed in connection with FIG. 1, the WAN address is not a publicly-routable transport address and an attempt by an Internet user to connect to the host using that address will fail.

Figure 6:
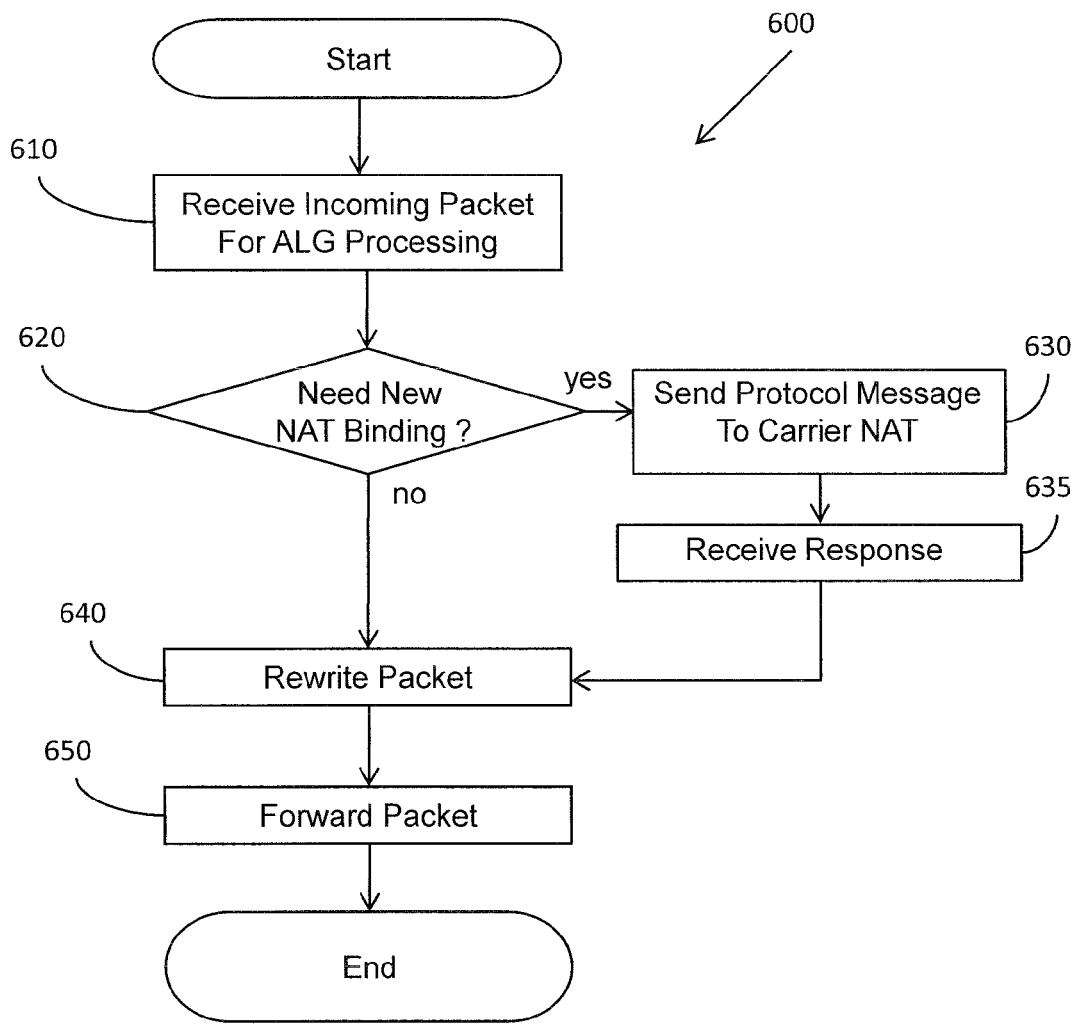
FIG. 6 illustrates an example method associated with multiple NAT traversal.

FIG. 6 illustrates an example method 600 for providing a publicly-routable transport address to a requesting host that communicates with an in-home NAT device that has ALG functionality. At 610, an incoming packet that includes the request is received by the in-home NAT device for ALG processing. At 620, a determination is made as to whether a new NAT binding is needed to process the packet. At 630, if a new NAT binding is needed, an address-port-borrowing-protocol message is sent to the carrier NAT device to obtain routing information. At 635, an address-port-borrowing-protocol response is received from the carrier NAT device. At 640 the packet is rewritten to reflect the NAT binding that includes routing information received from the carrier NAT device. At 650 the packet is forwarded to the requesting host. As discussed in connection with FIG. 2, the packet will include a publicly-routable transport address that facilitates traversal of both a carrier NAT device and an in-home NAT device.

Figure 7:
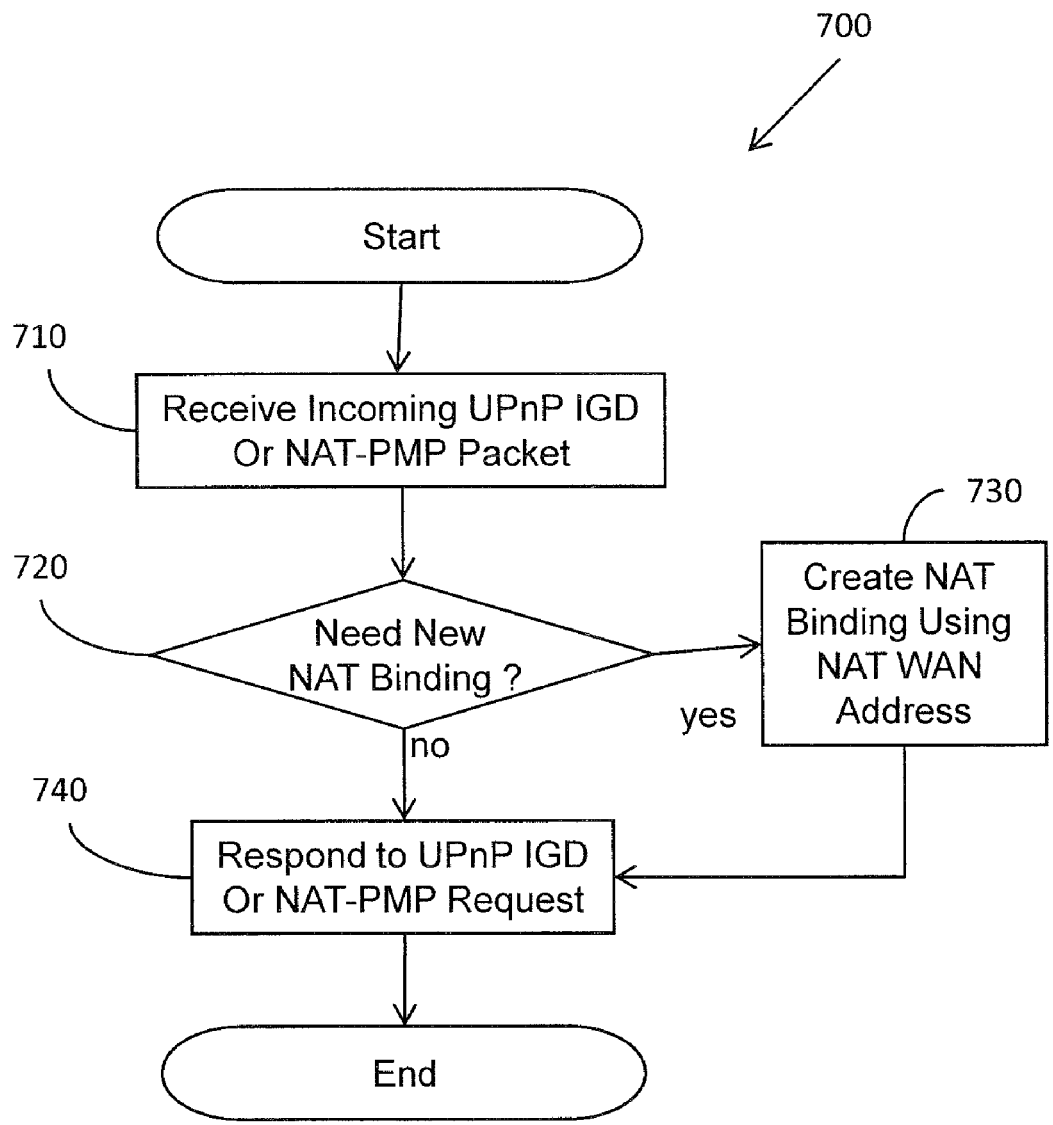
FIG. 7 illustrates an example method associated with NAT traversal.

FIG. 7 illustrates a method 700 of a NAT device that attempts to provide a publicly-routable transport address to a requesting host that utilizes UPnP IGD or NAT-PMP protocol to communicate with the NAT device. At 710, an incoming packet that includes the request is received by the in-home NAT device for processing. At 720, a determination is made as to whether a new NAT binding is needed to process the packet. At 730, if a new NAT binding is needed, the NAT binding is created using the NAT device's WAN address. At 740 the in-home NAT device responds to the request with the NAT binding that includes the WAN address. As discussed in connection with FIG. 1, if the NAT is behind another NAT, its WAN address is not a publicly-routable transport address and an attempt by an Internet user to connect using that address will fail.

Figure 8:
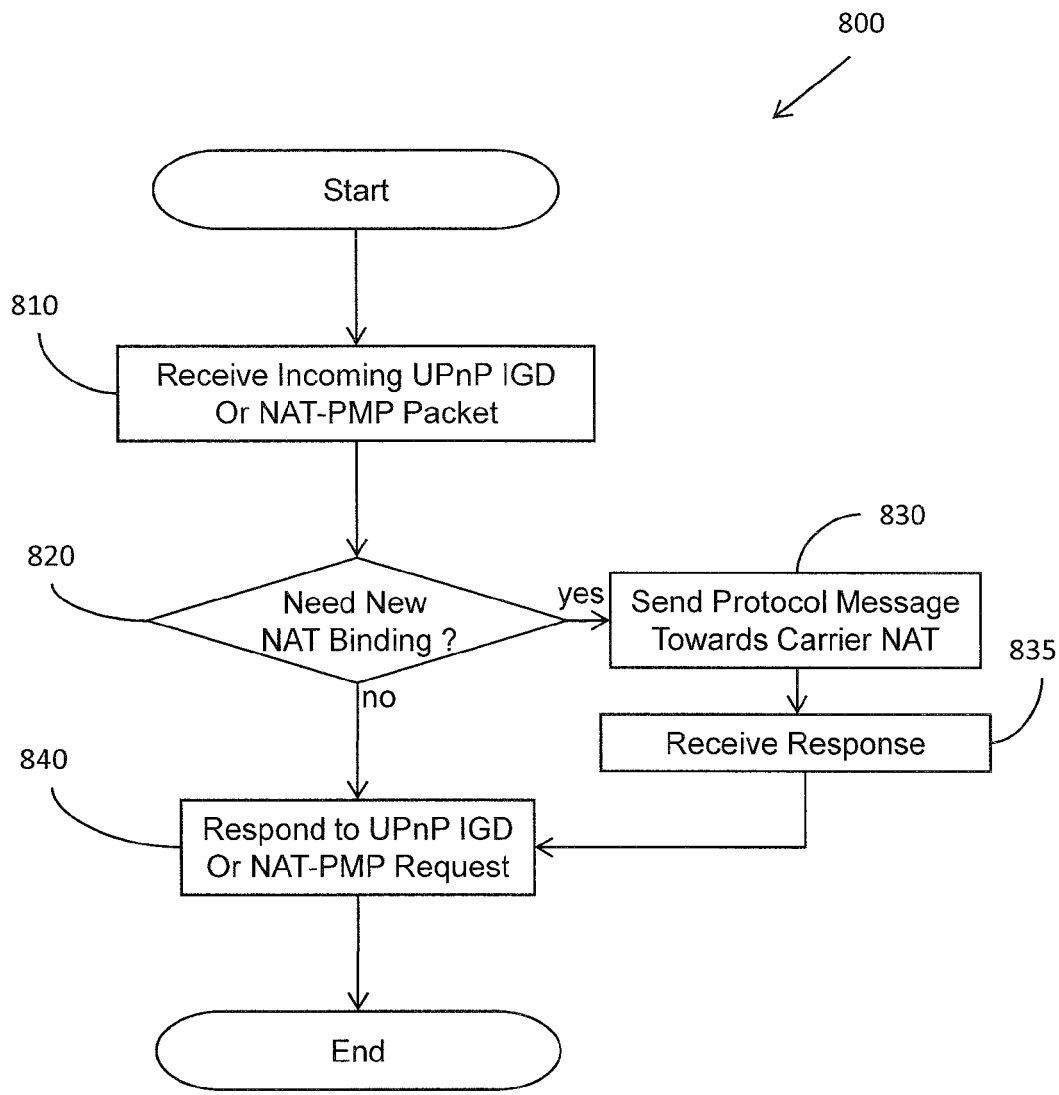
FIG. 8 illustrates an example method associated with multiple NAT traversal.

FIG. 8 illustrates an example method 800 for providing a publicly-routable transport address to a requesting host that utilizes UPnP IGD or NAT-PMP protocol to communicate with an in-home NAT device. At 810, an incoming packet that includes the request is received by the in-home NAT device for processing. At 820, a determination is made as to whether a new NAT binding is needed to process the packet. At 830, if a new NAT binding is needed, an address-port-borrowing-protocol message is sent to the carrier NAT device to obtain routing information. At 835, an address-port-borrowing-protocol response is received from the carrier NAT device. At 840 the in-home NAT device responds to the request with the NAT binding that includes the routing information received from the carrier NAT device. As discussed in connection with FIG. 2, the response will include a publicly-routable transport address that facilitates traversal of devices including a carrier NAT device, or an in-home NAT device.

Figure 9:
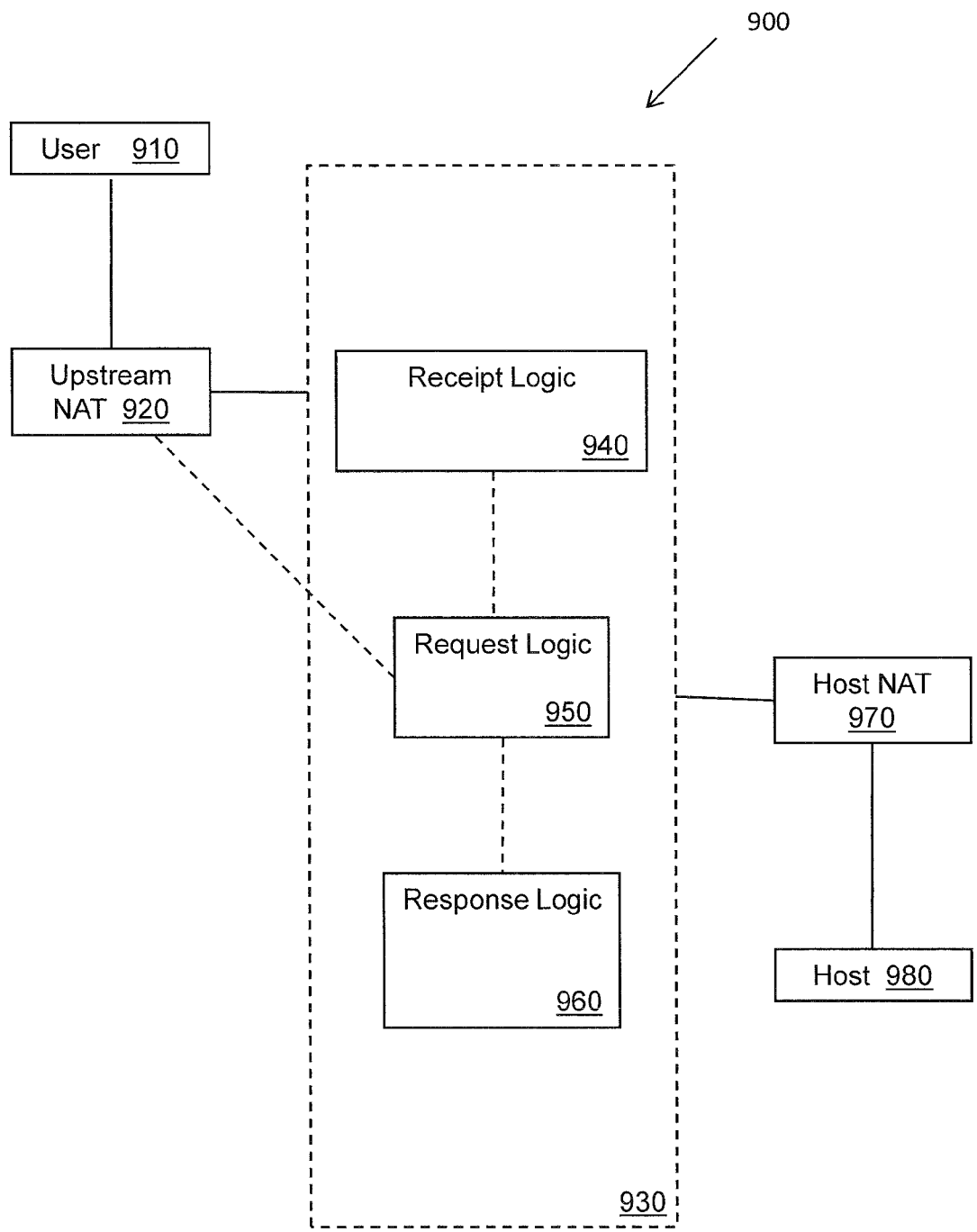
FIG. 9 illustrates a functional block diagram of an example multiple NAT traversal system.

FIG. 9 illustrates an example network 900 that includes a user device 910 that connects to a host device 980 by way of an upstream NAT device 920 and an in-home NAT device 970 associated with a private network (not shown) to which the host device 980 belongs. An address-port-borrowing-protocol that facilitates multiple NAT traversal is implemented in a set of address-port-borrowing-protocol logic components 930. The address-port-borrowing-protocol logic components 930 include a receipt logic 940, a request logic 950, and a response logic 960. The receipt logic 940 receives a request for a publicly-routable communication path identifier, (e.g., an IP address, a port) from the host device 980. The request may be, for example, a UPnP IGD, a NAT-PMP protocol request, or a packet for ALG processing. The request logic 950 requests information related to the publicly-routable communication path identifier from the upstream NAT device 920 that is disposed in the communication path between the host 980 and the user 910 and receives information related to the publicly-routable communication path identifier from the upstream NAT device 920. The response logic 960 provides the publicly-routable communication path identifier to the host device 980. The response logic 960 may respond to the host device 980 in manners including, for example, using the host device's UPnP IGD, using NAT-PMP protocol, or in the form of a rewritten ALG packet.

"Logic", as used herein with respect to apparatus, includes but is not limited to hardware, firmware, a method encoded on a tangible medium, and/or combinations thereof to perform a function(s) or an action(s), and/or to cause a function or action from another logic, method, and/or system. Logic may be encoded in one or more tangible media that stores computer executable instructions that if executed by a machine (e.g., ASIC) cause the machine to perform the encoded method. Logic may include a software controlled microprocessor, discrete logic (e.g., application specific integrated circuit (ASIC)), an analog circuit, a digital circuit, a programmed logic device, or a memory device containing instructions. Logic may include a gate(s), a combination of gates, or other circuit components. Where multiple logical units are described, it may be possible in some examples to incorporate the multiple logical units into one physical logic. Similarly, where a single logical logic is described, it may be possible in some examples to distribute that single logical logic between multiple physical units.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Figure 10:
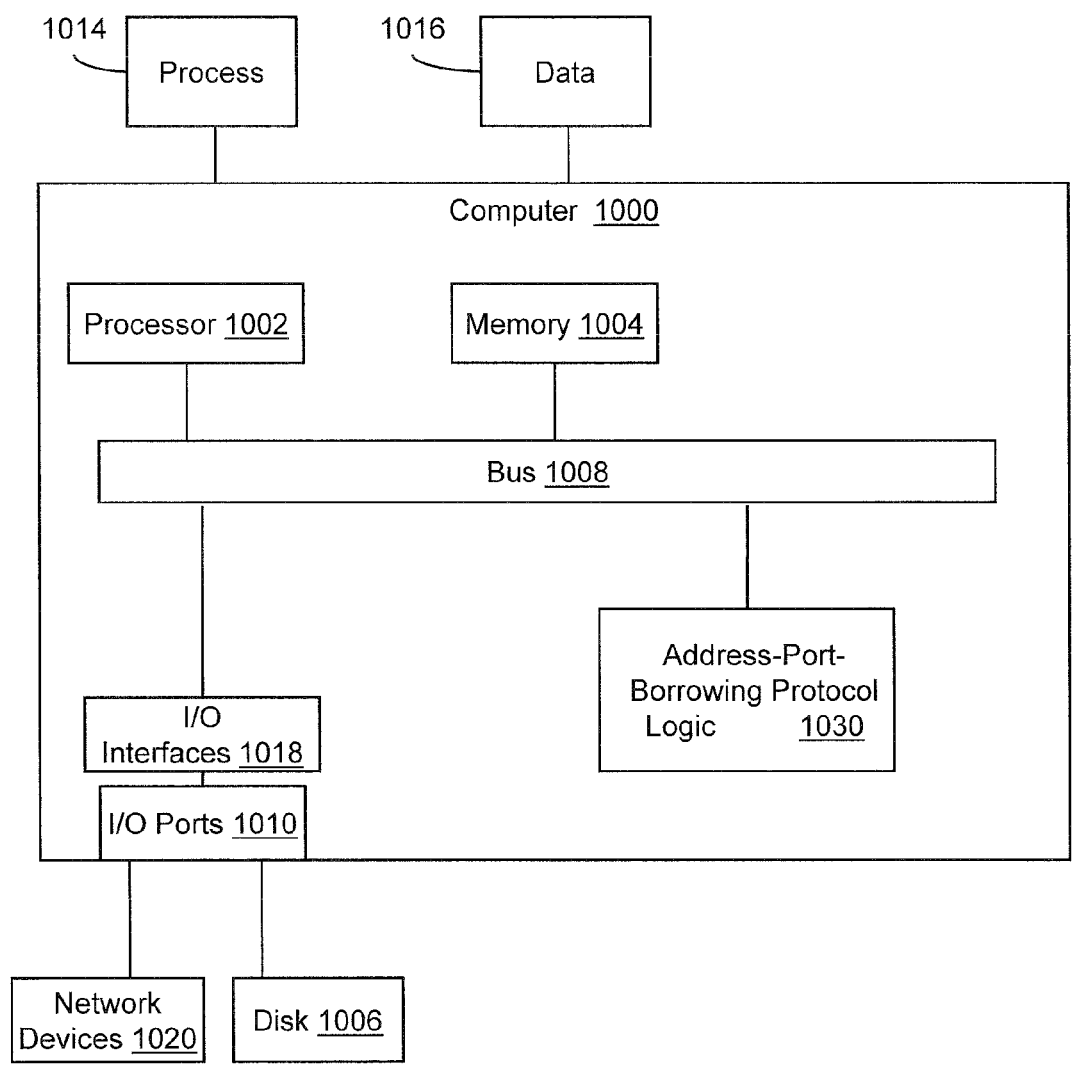
FIG. 10 illustrates an example computing environment in which example systems and methods, and equivalents, may operate.

FIG. 10 illustrates an example computing device in which example systems and methods described herein, and equivalents, may operate. The example computing device may be a computer 1000. Computer 1000 may be, for example, a NAT device that includes a processor 1002, a memory 1004, and input/output ports 1010 operably connected by a bus 1008. In one example, the computer 1000 may include an address-port-borrowing-protocol logic 1030 to communicate with an upstream NAT to obtain routing information to be used to provide a publicly-routable transport address for a host in a private network. The address-port-borrowing-protocol logic 1030 may be located in an ASIC. In different examples, the address-port-borrowing-protocol logic 1030 may be implemented in hardware, a method encoded on a tangible medium, firmware, and/or combinations thereof. While the address-port-borrowing-protocol logic 1030 is illustrated as a hardware component attached to the bus 1008, it is to be appreciated that in one example, the address-port-borrowing-protocol logic 1030 could be implemented in the processor 1002.

Thus, address-port-borrowing-protocol logic 1030 may provide means (e.g., hardware, firmware) for receiving a request for a publicly-routable communication path identifier from a host. The means may be implemented, for example, as an ASIC programmed to receive requests from hosts on a private network.

Address-port-borrowing-protocol logic 1030 may also provide means (e.g., hardware, firmware) for communicating with a second network address translation device disposed in a communication path between one or more user devices outside the private network and the host to acquire information related to the publicly-routable communication path identifier. The means may be implemented, for example, as an ASIC programmed to send an address-port-borrowing-protocol request to the second network address translation device.

Address-port-borrowing-protocol logic 1030 may also provide means (e.g., hardware, firmware) for receiving information related to the publicly-routable communication path identifier. Address-port-borrowing-protocol logic 1030 may also provide means (e.g., hardware, firmware) for communicating the publicly-routable communication path identifier to the host.

Generally describing an example configuration of the computer 1000, the processor 1002 may be a variety of various processors including dual microprocessor and other multi-processor architectures. A memory 1004 may include volatile memory and/or non-volatile memory. Non-volatile memory may include, for example, ROM, and programmable ROM (PROM). Volatile memory may include, for example, RAM, static RAM (SRAM), and dynamic RAM (DRAM). While a computer 1000 is described, the address-port-borrowing-protocol logic 1030 may appear in a networking device (e.g. a network address translation (NAT) device).

A disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, and a memory stick. Furthermore, the disk 1006 may be a CD-ROM drive, a CD recordable (CD-R) drive, a CD rewriteable (CD-RW) drive, a digital versatile disk and/or digital video disk ROM (DVD ROM). The memory 1004 can store a process 1014 and/or data 1016, for example. The disk 1006 and/or the memory 1004 can store an operating system that controls and allocates resources of the computer 1000.

The bus 1008 may be a single internal bus interconnect architecture and/or other bus or mesh architectures. While a single bus is illustrated, it is to be appreciated that the computer 1000 may communicate with various devices, logics, and peripherals using other busses (e.g., peripheral component interconnect express (PCIE), 1394, universal serial bus (USB), Ethernet). The bus 1008 can be types including, for example, a memory bus, a memory controller, a peripheral bus, an external bus, a crossbar switch, and/or a local bus.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, and/or the network devices 1020. The input/output ports 1010 may include, for example, serial ports, parallel ports, and USB ports.

The computer 1000 can operate in a network environment and thus may be connected to the network devices 1020 via the i/o interfaces 518, and/or the i/o ports 1010. Through the network devices 1020, the computer 1000 may interact with a network. Through the network, the computer 1000 may be logically connected to remote computers. Networks with which the computer 1000 may interact include, but are not limited to, a LAN, a WAN, and other networks.

While example systems and methods and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems and methods described herein. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. An apparatus, comprising:
one or more processors;
a receipt logic configured to be executed by the one or more processors and configured to receive a request from a host for a publicly-routable communication path identifier for the host that is a member of a private network that includes a first network address translation device associated with the private network, the host having a private communication path identifier;
a request logic configured to be executed by the one or more processors and configured to:
request information related to the publicly-routable communication path identifier from a second network address translation device that is disposed in a communication path between the host and one or more user devices outside of the private network;
receive the information related to the publicly-routable communication path identifier from the second network address translation device; and
a response logic configured to be executed by the one or more processors and configured to respond to the request by providing the publicly-routable communication path identifier to the host.

2. The apparatus of claim 1, where the receipt logic is configured to receive a request for a publicly-routable IP address.

3. The apparatus of claim 1, where the receipt logic is configured to receive a request for a publicly accessible IP address, transport protocol, and port number that provides access to the host.

4. The apparatus of claim 1, where the receipt logic is configured to receive an Internet Gateway Device Protocol as defined by a Universal Plug and Play Forum (UPnP IGP) packet from the host.

5. The apparatus of claim 4, where the request logic is configured to send a protocol message to the second network address translation device and the response logic is configured to respond to the request for a publicly-routable communication path identifier based, at least in part, on a response from the second network address translation device to the protocol message.

6. The apparatus of claim 1, where the receipt logic is configured to receive a network address translation port mapping protocol (NAT-PMP) packet from the host.

7. The apparatus of claim 5, where the request logic is configured to send a protocol message to the second network address translation device and the response logic is configured to respond to the request for a publicly-routable communication path identifier based, at least in part, on a response from the second network address translation device to the protocol message.

8. The apparatus of claim 1, where the receipt logic is configured to receive a packet from the host for application gateway layer processing.

9. The apparatus of claim 8, where the request logic is configured to send a protocol message to the second network address translation device; and where the response logic is configured to rewrite the packet based, at least in part, on a response to the protocol message from the second network address translation and to forward the rewritten packet.

10. The apparatus of claim 1, where one or more of the receipt logic, the request logic, and the response logic are disposed within the first network address translation device.

11. A method, comprising:
receiving, by a first network address translation device, a request from a host for a publicly-routable communication path identifier for the host that is a member of a private network associated with the first network address translation device, the host having a private communication path identifier;
requesting from a second network address translation device, using an address-port-borrowing protocol, information related to the publicly-routable communication path identifier,
where the second network address translation device is disposed in a communication path between one or more user devices outside the private network and the host;
receiving, with the first network address translation device, the information related to the publicly-routable communication path identifier from the second network address translation device; and
providing the publicly-routable communication path identifier to the host;
wherein at least the receiving the information related to the publicly-routable communication path identifier is performed by one or more computing devices.

12. The method of claim 11, where receiving the request includes receiving a request for a publicly-routable IP address.

13. The method of claim 11, where receiving the request includes receiving a request for a publicly-accessible IP address, transport protocol, and port number that provides access to the host.

14. The method of claim 11, where receiving the request includes receiving an Internet Gateway Device Protocol as defined by a Universal Plug and Play Forum (UPnP IGP) packet from the host,
where the requesting includes sending an address-port-borrowing-protocol message to the second network address translation device, and
where the providing includes responding to the request for a publicly-routable communication path identifier based, at least in part, on a response from the second network address translation device to the protocol message.

15. The method of claim 11, where receiving the request includes receiving a network address translation port mapping protocol (NAT-PMP) packet from the host, and where the requesting includes sending an address-port-borrowing-protocol message to the second network address translation device, and where the providing includes responding to the request for a publicly-routable communication path identifier based, at least in part, on a response from the second network address translation device to the protocol message.

16. The method of claim 11, where receiving the request includes receiving a packet from the host for application gateway layer processing, where the requesting includes sending an address-port-borrowing-protocol message to the second network address translation device, and where the providing includes rewriting the packet based, at least in part, on a response from the second network address translation device to the protocol message and forwarding the rewritten packet to the host.

17. A system, comprising:
means for receiving a request, from a host, for a publicly-routable communication path identifier for the host that is a member of a private network associated with a first network address translation device, the host having a private communication path identifier;
means for requesting from a second network address translation device disposed in a communication path between one or more user devices outside the private network and the host information related to the publicly-routable communication path identifier;
means for receiving the information related to the publicly-routable communication path identifier from the second network address translation device; and
means for communicating the publicly-routable communication path identifier to the host.

18. A non-transitory computer-readable storage medium storing computer executable instructions that, when executed by one or more processors, cause the one or more processors to perform the following:
receiving with a first network address translation device a request, from a host, for a publicly-routable communication path identifier for the host that is a member of a private network associated with the first network address translation device, the host having a private communication path identifier;
requesting from a second network address translation device, using an address-port-borrowing protocol, information related to the publicly-routable communication path identifier, where the second network address translation device is disposed in a communication path between one or more user devices outside the private network and the host;
receiving, with the first network address translation device, the information related to the publicly-routable communication path identifier from the second network address translation device; and
providing the publicly-routable communication path identifier to the host.

* * * * *